United States Patent
Khawer et al.

(10) Patent No.: US 11,678,313 B2
(45) Date of Patent: Jun. 13, 2023

(54) NETWORK CONTROLLED ACQUISITION OF UPLINK CHANNELS IN UNLICENSED FREQUENCY BANDS

(71) Applicants: Alcatel Lucent, Boulogne-Billancourt (FR); Alcatel-Lucent USA Inc., Murray Hill, NJ (US)

(72) Inventors: Mohammad R. Khawer, Lake Hopatcong, NJ (US); Teck H. Hu, Melbourne, FL (US); Matthew P. J. Baker, Canterbury (GB); Sigen Ye, Whitehouse Station, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 535 days.

(21) Appl. No.: 14/613,654

(22) Filed: Feb. 4, 2015

(65) Prior Publication Data

US 2016/0227536 A1    Aug. 4, 2016

(51) Int. Cl.
*H04W 76/15*    (2018.01)
*H04W 72/12*    (2023.01)
(Continued)

(52) U.S. Cl.
CPC ... *H04W 72/0453* (2013.01); *H04W 72/1215* (2013.01); *H04W 88/06* (2013.01)

(58) Field of Classification Search
CPC .......... H04W 72/0453; H04W 84/045; H04W 72/0446; H04W 72/0413; H04W 72/1278;
(Continued)

(56) References Cited

U.S. PATENT DOCUMENTS

2003/0083014 A1*  5/2003  Li ................. H04W 48/20
                                              455/63.1
2008/0273486 A1*  11/2008  Pratt ................. H04L 67/2823
                                              370/328
(Continued)

FOREIGN PATENT DOCUMENTS

CN    101378286 A    3/2009
CN    102365889 A    2/2012
(Continued)

OTHER PUBLICATIONS

Translation of Office Action Type dated Jun. 20, 2018 JPO Patent Application No. 2017-541352 pp. 1-4.
(Continued)

*Primary Examiner* — Khaled M Kassim
*Assistant Examiner* — Jason A Harley
(74) *Attorney, Agent, or Firm* — Tong, Rea, Bentley & Kim, LLC

(57) ABSTRACT

A base station requires one or more channels in an unlicensed frequency band for a predetermined time interval and schedules one or more user equipment for uplink transmission on the one or more channels during the predetermined time interval. User equipment transmits, over a licensed frequency band, a request for resources for uplink transmission in an unlicensed frequency band. The user equipment receives scheduling information indicating a first portion of a predetermined time interval that is allocated to the first user equipment for uplink transmission on one or more channels in the unlicensed frequency band.

21 Claims, 4 Drawing Sheets

US 11,678,313 B2
Page 2

(51) Int. Cl.
*H04J 1/16* (2006.01)
*H04B 17/318* (2015.01)
*H04L 5/00* (2006.01)
*H04W 72/04* (2023.01)
*H04W 76/10* (2018.01)
*H04J 3/00* (2006.01)
*H04W 72/0453* (2023.01)
*H04W 88/06* (2009.01)

(58) Field of Classification Search
CPC ......... H04W 92/18; H04J 3/00; H04J 3/1694; H04L 12/2823
USPC ....................................................... 455/509
See application file for complete search history.

(56) References Cited

U.S. PATENT DOCUMENTS

| | | | |
|---|---|---|---|
| 2009/0046675 A1* | 2/2009 | Pratt, Jr. | H04W 84/18 370/337 |
| 2009/0239545 A1* | 9/2009 | Lee | H04W 74/002 455/450 |
| 2010/0216482 A1* | 8/2010 | Hoole | H04W 72/087 455/450 |
| 2010/0246506 A1 | 9/2010 | Krishnaswamy | |
| 2011/0242990 A1* | 10/2011 | Simonsson | H04W 72/085 370/242 |
| 2011/0287794 A1* | 11/2011 | Koskela | H04W 36/22 455/509 |
| 2012/0077510 A1* | 3/2012 | Chen | H04W 28/26 455/452.1 |
| 2012/0307748 A1 | 12/2012 | Cheng et al. | |
| 2013/0010722 A1* | 1/2013 | Suzuki | H04W 74/08 370/329 |
| 2013/0051358 A1* | 2/2013 | Turtinen | H04W 74/0816 370/330 |
| 2013/0155905 A1* | 6/2013 | Sampath | H04W 48/16 370/255 |
| 2013/0155991 A1* | 6/2013 | Kazmi | H04W 72/0453 370/329 |
| 2014/0029561 A1* | 1/2014 | Kim | H04L 5/0053 370/329 |
| 2015/0098397 A1* | 4/2015 | Damnjanovic | H04W 74/08 370/329 |
| 2015/0180676 A1* | 6/2015 | Bao | H04L 12/1886 370/230 |
| 2015/0312793 A1* | 10/2015 | Jeon | H04W 74/0816 370/329 |
| 2016/0007350 A1* | 1/2016 | Xiong | H04W 24/10 370/252 |
| 2016/0021682 A1* | 1/2016 | Wang | H04W 74/04 370/329 |
| 2016/0066306 A1* | 3/2016 | Khawer | H04W 72/0446 370/329 |
| 2016/0233989 A1* | 8/2016 | Belghoul | H04L 5/0092 |
| 2017/0303220 A1* | 10/2017 | Sadeghi | H04L 5/0053 |
| 2017/0353866 A1* | 12/2017 | Gou | H04L 5/0091 |

FOREIGN PATENT DOCUMENTS

| | | |
|---|---|---|
| WO | 2012074343 | 6/2012 |
| WO | 2014024174 A2 | 2/2014 |
| WO | 2014200951 | 12/2014 |
| WO | 2014200951 A2 | 12/2014 |

OTHER PUBLICATIONS

LG Electronics, "Candidate Solutions for LAA Operation", 3GPP TSG RAN WG1 Meeting #78bis, R1-144042, Ljubljana, Solvenia, Oct. 10, 2014, 6 pages.

Huawei, HiSilicon, "Review of Existing Unlicensed Spectrum Regulatory Requirements Affecting Physical Layer Design", 3GPP TSG RAN WG1 Meeting #78bis, R1-143724, Oct. 10, 2014, 8 pages.

ZTE, "Regulatory Requirements Affecting RAN1 for Licensed-Assisted Access Using LTE", 3GPP TSG RAN WG1 Meeting #78bis, R1-143826, Oct. 10, 2014, 4 pages.

Translation of Notice of Preliminary Rejection dated Nov. 20, 2018 for Korean Application No. 10-2017-7021590, 7 pages.

Translation of Office Action dated Dec. 11, 2018 for European Application No. 16 710 805.9, 6 pages.

Office Action dated Sep. 25, 2019 for Korean Application No. 10-2017-7021590, 6 pages.

Japanese Office Action dated Jul. 30, 2019 for Japanese Patent Application No. 2017-541352, 8 pages.

"Candidate Solutions for LAA Operation", LG Electronics, 3GPP TSG RAN WG1 Meeting #78bis, R1-144042, Oct. 2014, 6 pages.

"Review of Existing Unlicensed Spectrum Regulatory Requirements Affecting Physical Layer Design", 3GPP TSG RAN WG1 Meeting #78bis, R1-143724, Oct. 2014, 8 pages.

"Regulatory Requirements Affecting RAN1 for Licensed-Assisted Access Using LTE", ZTE, 3GPP TSG RAN WG1 Meeting #78bis, R1-143826, Oct. 2014, 5 pages.

"LBT Operation Details and Initial Evaluation Results", LG Electronics, 3GPP TSG RAN WG1 Meeting #79, R1-144900, Nov. 2014, 7 pages.

Office Action dated Mar. 3, 2020 for Japanese Patent Application No. 2017-541352, 8 pages.

Office Action dated Jul. 7, 2020 for Japanese Patent Application No. 2017-541352, 4 pages.

* cited by examiner

NETWORK CONTROLLED ACQUISITION OF UPLINK CHANNELS IN UNLICENSED FREQUENCY BANDS

BACKGROUND

1. Field of the Disclosure

The present disclosure relates generally to wireless communication and, more particularly, to unlicensed frequency bands in wireless communication.

2. Description of the Related Art

Unlicensed frequency bands are portions of the radiofrequency spectrum that do not require a license for use and may therefore be used by any device to transmit or receive radiofrequency signals. Unlicensed frequency bands can be contrasted to licensed frequency bands that are licensed to a particular service provider and may only be used for wireless communication that is authorized by the service provider. Wireless communication devices that transmit or receive signals in licensed or unlicensed frequency bands are typically referred to as nodes, which may include user equipment, base stations that operate according to standards such as Long Term Evolution (LTE) standards defined by the Third Generation Partnership Project (3GPP), and Wi-Fi access points that operate in the unlicensed spectrum according to the 802.11 standards defined by the Institute of Electrical and Electronics Engineers (IEEE). Prior to transmitting signals in a frequency band of the unlicensed spectrum, nodes sense (or "listen") to the frequency band. A node may acquire the frequency band for transmission of signals for a predetermined time interval if the frequency band is clear, e.g., the sensed signal strength is below a threshold. However, the node should bypass transmission and repeat the attempt after a random time interval if the frequency band is not clear, a process that is referred to as "backing off."

SUMMARY OF EMBODIMENTS

The following presents a summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, a method is provided for network-controlled acquisition of unlicensed frequency bands for uplink transmission. The method includes acquiring, at a base station, one or more channels in an unlicensed frequency band for a predetermined time interval. The method also includes scheduling, at the base station, one or more user equipment for uplink transmission on the one or more channels during the predetermined time interval.

In some embodiments, a method is provided for requesting network-controlled acquisition of unlicensed frequency bands for uplink transmission. The method includes transmitting, from a first user equipment over a licensed frequency band, a request for resources for uplink transmission in an unlicensed frequency band. The method also includes receiving, at the first user equipment, scheduling information indicating a first portion of a predetermined time interval that is allocated to the first user equipment for uplink transmission on one or more channels in the unlicensed frequency band.

In some embodiments, a base station is provided for supporting network-controlled acquisition of unlicensed frequency bands for uplink transmission. The base station includes a transceiver to acquire one or more channels in an unlicensed frequency band for a predetermined time interval. The base station also includes a processor to schedule one or more user equipment for uplink transmission on the one or more channels during the predetermined time interval.

In some embodiments, user equipment is provided that performs uplink transmission in unlicensed frequency bands acquired by the network. The user equipment includes a transceiver to transmit, over a licensed frequency band, a request for resources for uplink transmission in an unlicensed frequency band. The transceiver also receives scheduling information indicating a first portion of a predetermined time interval that is allocated to the first user equipment for uplink transmission on one or more channels in the unlicensed frequency band.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
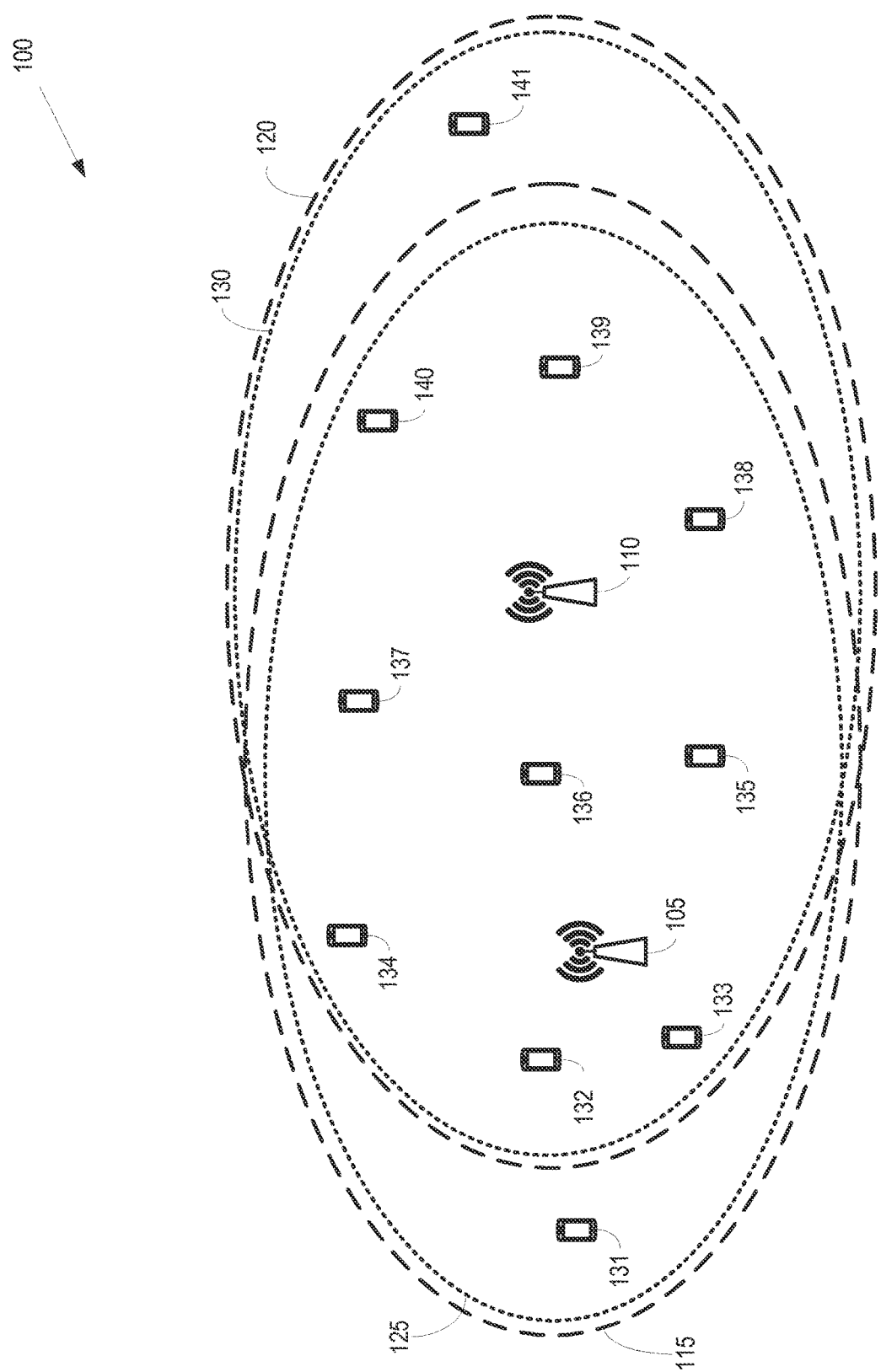
FIG. 1 is a diagram of a wireless communication system according to some embodiments.

Collisions between nodes that are contending for the same frequency band at the same time are expected to be relatively infrequent for downlink transmissions because of the relatively low density of base stations or Wi-Fi access points. In contrast, each base station or access point may serve tens or hundreds of user equipment. The density of user equipment may therefore be orders of magnitude higher than the density of base stations or access points, which may lead to a corresponding increase in the frequency of collisions between user equipment contending for the same uplink resources. User equipment may therefore waste significant resources performing multiple back offs before the user equipment is able to acquire an unlicensed frequency band for uplink transmission. Latency may also be increased by multiple back offs performed when contention is high. Moreover, currently there is no viable way to multiplex uplink transmissions from several user equipment onto one acquired channel in the unlicensed spectrum during the predetermined acquisition time interval. Once a user equipment has completed its uplink transmission, it releases the channel even if the predetermined time interval has not completely elapsed. Thus, other user equipment served by the same base station cannot take advantage of the unused portion of the predetermined time interval. Instead, the other user equipment must independently acquire the channel as discussed herein, which may unnecessarily create additional latency if contention is high. Uplink channel contention may be exacerbated when user equipment contend for uplink resources of multiple base stations that operate according to different radio access technologies (such as LTE and Wi-Fi) and share the same unlicensed frequency bands in overlapping coverage areas.

Unlicensed frequency bands can be efficiently allocated to user equipment for uplink transmissions by base stations that acquire clear channels in the unlicensed frequency band for a predetermined time interval and then schedule one or more user equipment for uplink transmission on the acquired channels during the predetermined time interval. The base station may detect clear channels by sensing a signal strength that is below a threshold value and then acquire the clear channels by transmitting sufficient signal energy on the channel in a first portion of the predetermined time interval so that other nodes can sense that the acquired channel is no longer clear. The base station can schedule one or more user equipment to the acquired channel on a time-division duplexed basis during one or more second portions of the predetermined time interval. Some embodiments of the base station schedule the user equipment based on a request from the user equipment for uplink resources received in a licensed frequency band, a quality of the acquired channel, and the like. User equipment may be informed of the scheduled uplink communication using downlink control messages (or other indications) transmitted by the base station on a control channel in the licensed frequency band. The downlink control messages may include information indicating physical resource blocks allocated for the uplink transmission, a modulation and coding scheme for the uplink transmission, and the like. The base station may also signal a starting time or ending time (or corresponding starting/ending symbols in a subframe) for the uplink transmission by each scheduled user equipment.

As used herein, the term "predetermined" indicates that the time interval is specified prior to the acquisition of the channel of the unlicensed frequency band. In some embodiments, the predetermined time interval is set by standards, protocols, or regulations that apply within a particular jurisdiction including the base stations 105, 110 and the user equipment 131-141. For example, in different jurisdictions, the predetermined time interval is 4 milliseconds (ms) or 10 ms. The predetermined time interval may therefore be the same for all base stations and user equipment operating in the same jurisdiction.

FIG. 1 is a diagram of a wireless communication system 100 according to some embodiments. The wireless communication system 100 includes base stations 105, 110 that provide wireless connectivity according to a first radio access technology, e.g., according to the Long Term Evolution (LTE) standards defined by the Third Generation Partnership Project (3GPP). The base stations 105, 110 may provide uplink or downlink communications over one or more carriers in a licensed frequency band within a corresponding geographic areas or cells indicated by the dashed ovals 115, 120. The carriers in the licensed frequency band may be referred to as LTE licensed (LTE-L) carriers.

The base stations 105, 110 also support uplink or downlink communication over one or more carriers in one or more unlicensed frequency bands within a geographic area or cell indicated by the dotted ovals 125, 130. The carriers in the licensed frequency band may be referred to as LTE unlicensed (LTE-U) carriers. Examples of unlicensed frequency bands include the Unlicensed National Information Infrastructure (UNII), which is formed of portions of the radio spectrum that include frequency bands in the range of 5.15 GHz to 5.825 GHz such as the U-NII-1 band in the range 5.15-5.25 GHz, the U-NII 2a, b, c bands in the range 5.25-5.725 GHz, and the U-NII 3 band in the range 5.725-5.825 GHz. Other examples of unlicensed frequency bands include the industrial, scientific, and medical (ISM) frequency bands that are reserved for the use of radiofrequency energy for industrial, scientific, and medical purposes. The ISM bands include frequency bands around 6 MHz, 13 MHz, 27 MHz, 40 MHz, 433 MHz, 900 MHz, 2.4 GHz, 5.8 GHz, 24 GHz, 61 GHz, 122 GHz, and 244 GHz.

Some embodiments of the base stations 105, 110 (or other base stations or access points not shown in FIG. 1) may support wireless communication in the unlicensed frequency bands according to other radio access technologies such as Wi-Fi communication according to the 802.11 standards defined by the IEEE. For example, a Wi-Fi access point may be integrated with (or co-located with) one or more of the base stations 105, 110. The wireless communication system 100 may also include independent Wi-Fi access points.

The licensed cells 115, 120 (which may be referred to as primary cells or Pcells) may cover substantially the same area as the unlicensed cells 125, 130 (which may be referred to as secondary or supplemental cells or Scells). However, in some embodiments, the licensed cells 115, 120 may only partially overlap the unlicensed cells 125, 130. Furthermore, in some embodiments, the geographic extent of the licensed cells 115, 120 may be larger than the geographic extent of the unlicensed cells 125, 130, e.g., due to limitations on uplink or downlink transmission powers in the licensed or unlicensed frequency bands.

The base stations 105, 110 provide wireless connectivity to user equipment 131, 132, 133, 134, 135, 136, 137, 138, 139, 140, 141, which are collectively referred to herein as "the user equipment 131-141." Different base stations 105, 110 may act as the serving base station for different subsets of the user equipment 131-141. For example, the base station 105 may be the serving base station for user equipment 131-136 and the base station 110 may be the serving base station for user equipment 137-141. Serving base stations 105, 110 are responsible for acquiring channels in the unlicensed frequency bands (e.g., in the cells 120, 130) for the corresponding user equipment 131-141. For example, the base station 105 may be responsible for acquiring channels for uplink transmission by the user equipment 131-136 in the unlicensed frequency band and the base station 110 may be responsible for acquiring channels for uplink transmission by the user equipment 137-141 in the unlicensed frequency band. Serving base stations 105, 110 are also responsible for providing control signals to the user equipment 131-141 and receiving the request messages from the user equipment 131-141 over channels of the licensed frequency band.

Clear channel assessment (CCA) may be used to identify clear channels for allocation to uplink transmissions by the user equipment 131-141. For example, the user equipment 131-136 can transmit requests for uplink resources to the serving base station 105 over a licensed frequency band (e.g., in the cell 115). The base station 105 may then attempt to acquire one or more channels in the unlicensed frequency band by sensing the channels in the unlicensed frequency band. If the energy detected in a channel of the unlicensed frequency band is below a threshold that indicates that the channel is clear of interfering transmissions from other base stations or access points, the base station 105 acquires the channel by transmitting energy (such as a random sequence or a preamble) on the channel to reserve the channel. The acquired channel is then reserved for a predetermined time interval. The base station 105 is free to transmit signals or allocate the channel to one or more user equipment 131-136 for transmission during the predetermined time interval. The base station 105 may therefore schedule uplink transmissions by the one or more user equipment 131-136 during portions of the predetermined interval, as discussed herein.

Figure 2:
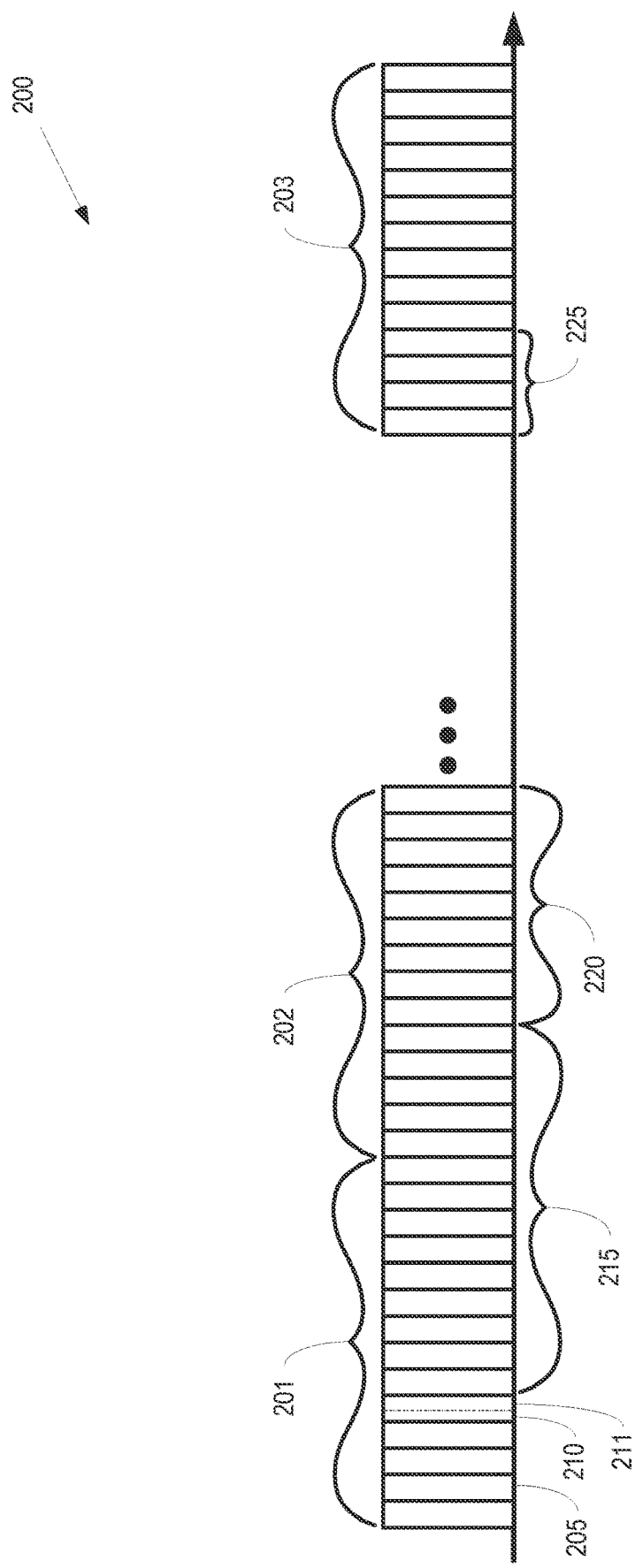
FIG. 2 is a timing diagram of a sequence of subframes that are subdivided into symbols according to some embodiments.

FIG. 2 is a timing diagram of a sequence 200 of subframes that are subdivided into symbols according to some embodiments. The sequence 200 may be used for transmissions over one or more channels in an unlicensed frequency band by some embodiments of the base stations 105, 110 and the user equipment 131-141 shown in FIG. 1. The portion of the sequence 200 shown in FIG. 2 includes subframes 201, 202, 203 (which may be referred to collectively as "the subframes 201-203") and each of the subframes 201-203 is further subdivided into a plurality of symbols 205 (only one indicated by a reference numeral in the interest of clarity). In one embodiment, each of subframes 201-203 corresponds to a time interval of 1 ms and is subdivided into fourteen symbols 205. However, the duration of the subframes 201-203 and the corresponding number of symbols 205 may be different in other embodiments.

A base station can acquire a channel in the unlicensed frequency band for a time interval corresponding to one or more subframes 201-203 or one or more symbols 205. The acquisition time interval is predetermined according to standards or protocols that govern operation of the base station and associated user equipment. For example, the acquisition time interval may be set to be less than or equal to a maximum channel occupancy time allowed by regulatory requirements in the jurisdiction occupied by the base station or user equipment. The maximum channel occupancy time may be different in different jurisdictions, e.g., Japan allows a maximum channel occupancy time of 4 ms and other countries may allow maximum channel occupancy time of 10 ms. The acquisition time interval may be represented as a duration (e.g., 4 ms or 10 ms), as a number of subframes (e.g., 4 subframes or 10 subframes), or as a number of symbols (e.g., 64 symbols or 140 symbols).

In the illustrated embodiment, the base station initiates channel acquisition by sensing the channel in a first portion 210 of the fifth slot in the subframe 201. If the energy sensed by the base station in the first portion 210 is less than a threshold value indicating that the channel is clear, the base station acquires the channel by transmitting energy in a second portion 211 of the fifth slot of the subframe 201. Transmitting the energy in the second portion 211 reserves the channel for the base station because other base stations or user equipment that sense the channel detect that the energy is above the threshold and the channel is not clear. The energy transmitted by the base station in the second portion 211 may be produced by a random signal or other signal such as a preamble. The base station acquires the channel for an acquisition time interval that extends to the fourth symbol of the subframe 203. The acquired channel is released after the fourth symbol of the subframe 203.

Once the base station has acquired the channel, the base station can allocate symbols in the acquired portions of the subframes 201-203 to one or more user equipment for uplink transmissions over the acquired channel of the unlicensed frequency band. For example, the base station allocates a first set 215 of symbols from the subframes 201, 202 to a first user equipment for uplink transmissions, a second set 220 that includes symbols from the subframe 202 (and potentially the subsequent subframe) to a second user equipment, and a third set 225 that includes symbols from the subframe 203 (and potentially the previous subframe) to a third user equipment. Thus, the user equipment are allocated the acquired channel on a time division multiplexed basis.

The number of user equipment that are allocated symbols from the subframes 201-203 during the acquisition time interval, as well as the durations of the time intervals or numbers of subframes/symbols, may be determined based on information associated with the user equipment. For example, the subframes or symbols may be allocated to the user equipment based on priorities associated with the user equipment, channel qualities of the channels associated with the user equipment, measured signal strengths or signal-to-noise ratios (SNRs) for uplink signals transmitted by the user equipment, the amount of data available (e.g., in one or more buffers at the user equipment) for transmission over the uplink by the user equipment, and the like.

The base station may stop transmitting signal energy at the sixth symbol in the subframe 201 so that the channel is clear for uplink transmissions by the user equipment that has been allocated the first set 215 of symbols that begins at the sixth slot in the subframe 201. For example, the base station may stop transmitting the random signals or preamble signals that were transmitted during the second portion 211 to prevent other contending base stations from acquiring the channel. Some embodiments of the base station may continue to broadcast overhead signals on the acquired channel of the unlicensed frequency band during symbols subsequent to the second portion 211. For example, the base station may continue to broadcast cell-specific reference signals on the acquired channel of the unlicensed frequency band.

Figure 3:
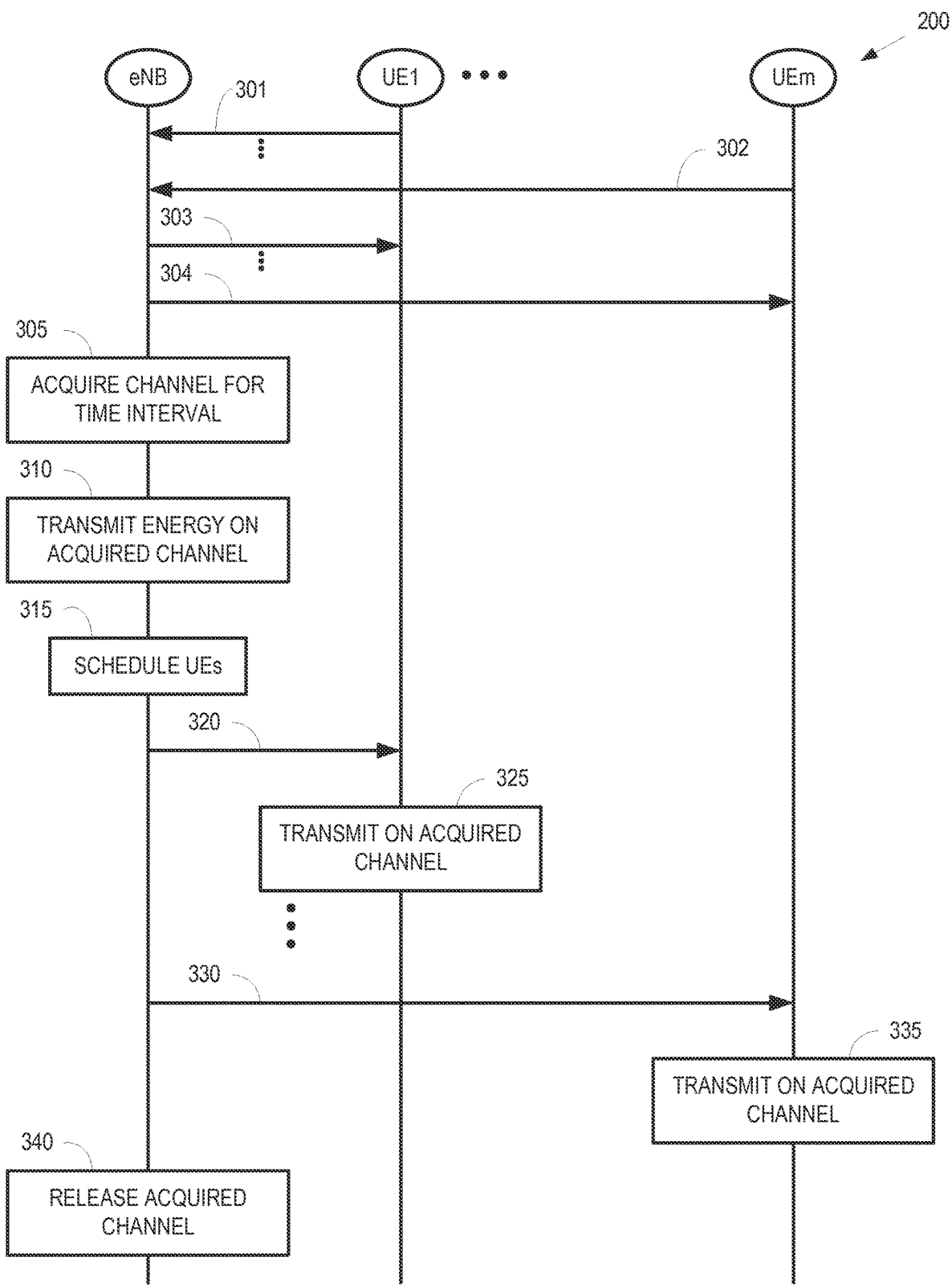
FIG. 3 is a diagram of a method for allocating a channel acquired by a base station to user equipment for uplink transmissions on a time division multiplexed basis according to some embodiments.

FIG. 3 is a diagram of a method 300 for allocating a channel acquired by a base station to user equipment for uplink transmissions on a time division multiplexed basis according to some embodiments. The method 300 may be implemented by some embodiments of the base stations 105, 110 and the user equipment 131-141 shown in FIG. 1. In the illustrated embodiment, a base station (eNB) is serving a plurality of user equipment (UE1, . . . , UEm) that are within a Pcell associated with a licensed frequency band and an Scell associated with an unlicensed frequency band. For example, the base station may correspond to the base station 105 that is serving the user equipment 131-136 in the licensed cell (or Pcell) 115 and the unlicensed cell (or Scell) 120, as shown in FIG. 1.

The base station receives one or more messages 301, 302 from the user equipment requesting resources for uplink transmissions from the user equipment. The messages 301, 302 are transmitted to the base station on channels of the licensed frequency band. Some embodiments of the messages 301, 302 may include information indicating the amount of data available for transmission from the corresponding user equipment, a priority associated with the corresponding user equipment, channel quality information, and the like. The base station responds to the messages 301, 302 by sending messages 303, 304 in the licensed frequency band including configuration information for the corresponding user equipment. Some embodiments of the messages 303, 304 are downlink control messages that include information indicating physical resource blocks that are allocated to the corresponding user equipment for uplink transmission, a modulation and coding scheme, and the like. The downlink control message may also include a flag that is set to indicate that the user equipment is to wait for a subsequent indication that the channel is clear for uplink transmission before beginning uplink transmission. Preconfiguring the user equipment based on the information in the messages 303, 304 may reduce the time that elapses before the user equipment are able to begin uplink transmissions in response to signaling from the base station.

At block 305, the base station acquires the channel in the unlicensed frequency band for a time interval. Some embodiments of the base station implement a CCA process for acquiring the channel in the unlicensed frequency band. For example, the base station may sense the channel to determine whether the channel is clear and then begin transmitting signal energy (at block 310) to reserve the channel if the channel is clear, as discussed herein. At block 315, the base station schedules one or more of the user equipment for uplink transmissions on the acquired channel of the unlicensed frequency band during the time interval. Scheduling of the base stations occurs in response to receiving the messages 301, 302 and may be performed based on information included in the messages 301, 302. The base station schedules the one or more user equipment on a time division multiplexed basis so that the acquired channel is allocated to different user equipment during different portions of the time interval.

The base station transmits a scheduling message 320 to the first user equipment to indicate that the acquired channel has been allocated to the first user equipment for uplink transmissions during a first portion of the time interval. The scheduling message 320 may include information indicating a starting time, a finishing time, or a duration of the first portion. The scheduling message 320 may also include (in addition to or instead of the previously mentioned timing information) information indicating a starting subframe/symbol, and ending subframe/symbol, or a number of subframes or symbols in the first portion. Some embodiments of the scheduling message 320 are transmitted in the licensed frequency band. At block 325, the first user equipment transmits uplink signals on the acquired channel in the unlicensed frequency band.

The base station transmits a scheduling message 330 to the second user equipment to indicate that the acquired channel has been allocated to the second user equipment for uplink transmissions during a second portion of the time interval. The scheduling message 330 may include the same type of information as the scheduling message 320 and some embodiments of the scheduling message 330 may be transmitted in the licensed frequency band. At block 335, the second user equipment transmits uplink signals on the acquired channel in the unlicensed frequency band. The base station may receive and process the signals received on the uplink from the user equipment.

At block 340, the base station releases the acquired channel, e.g., in response to the acquisition time interval elapsing.

The sequence of messages and actions of the method 300 shown in FIG. 3 may differ in some embodiments. For example, the messages 303, 304 may be transmitted after the user equipment have been scheduled (at block 315) to the channel in the unlicensed frequency band. The messages 303, 304 may be transmitted as independent messages or the information in the messages 303, 304 may be included in the messages 320, 330. For another example, the messages 320, 330 may be transmitted to the scheduled user equipment prior to the user equipment transmitting (at block 325, 335) any uplink signals on the acquired channel of the unlicensed frequency band. The user equipment may then use the information included in the messages 320, 330 to determine when to transmit the corresponding uplink signals.

Figure 4:
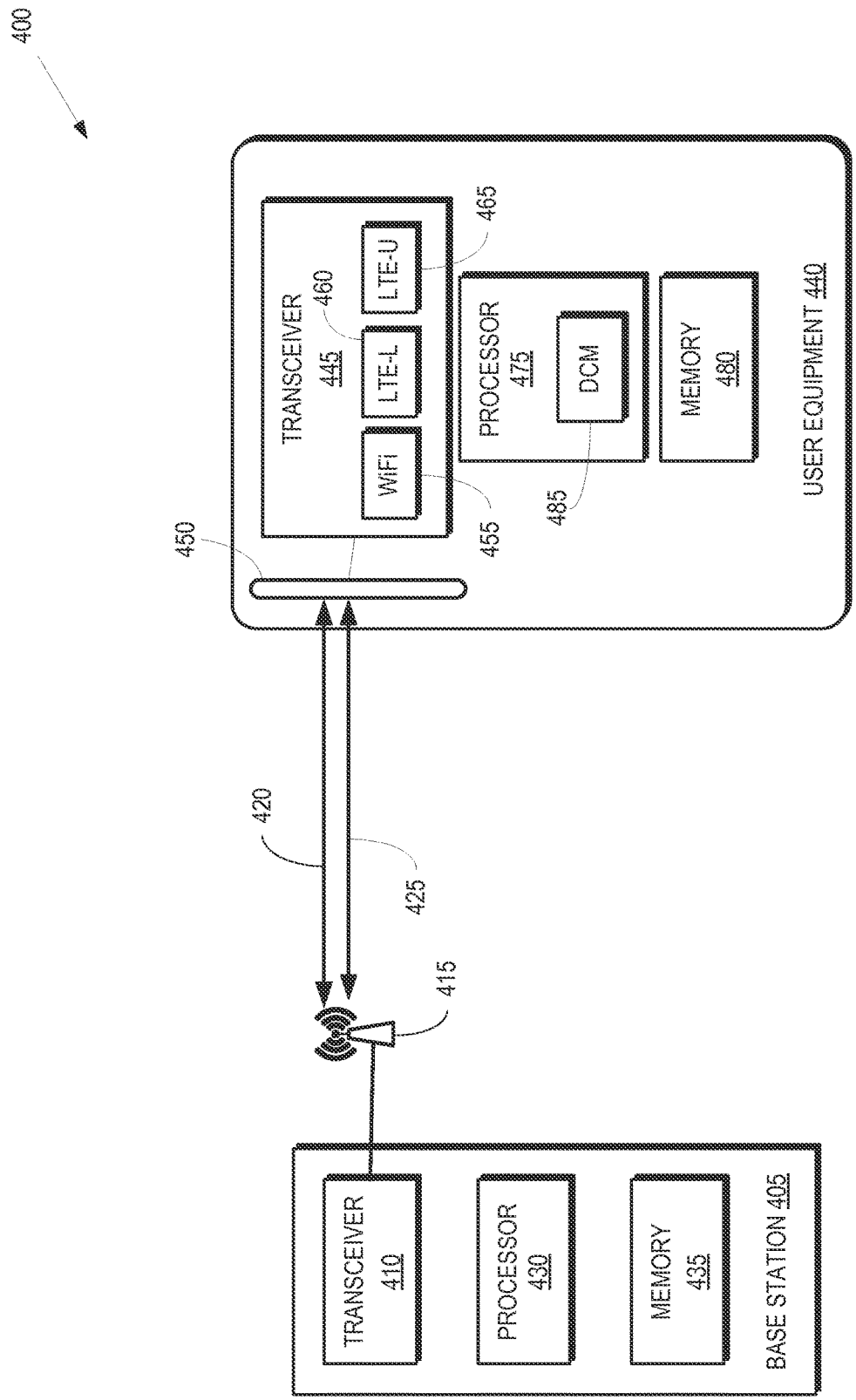
FIG. 4 is a block diagram of a wireless communication system according to some embodiments.

FIG. 4 is a block diagram of a wireless communication system 400 according to some embodiments. The wireless communication system 400 includes a base station 405 that operates according to a first radio access technology, such as a base station 405. Some embodiments of the base station 405 may be used to implement the base stations 105, 110 shown in FIG. 1. The base station 405 includes a transceiver 410 for transmitting and receiving signals using one or more antennas 415. The signals may include uplink or downlink signals transmitted over an LTE-L carrier 420 in a licensed frequency band. The signals may also include uplink or downlink signals transmitted over an LTE-U carrier 425 in an unlicensed frequency band. The LTE carriers 420, 425 may be aggregated to increase the total bandwidth provided by the base station 405. The base station 405 also includes a processor 430 and a memory 435. The processor 430 may be used to execute instructions stored in the memory 435 and to store information in the memory 435 such as the results of the executed instructions. Some embodiments of the processor 430 and the memory 435 may be configured to perform portions of the method 300 shown in FIG. 3.

The wireless communication system 400 includes user equipment 440. The user equipment 440 includes a transceiver 445 for transmitting and receiving signals via antenna 450. Some embodiments of the transceiver 445 include multiple radios for communicating according to different radio access technologies such as a Wi-Fi radio 455, a radio 460 for communication in licensed LTE frequency bands (LTE-L), and a radio 465 for communication in unlicensed LTE frequency bands (LTE-U). For example, the LTE-L radio 460 in the user equipment 440 may communicate with the base station 405 using the LTE-L carriers 420 in the licensed frequency band. The LTE-U radio 465 in the user equipment 440 may communicate with the base station 405 using the LTE-U carriers 425 in the unlicensed frequency band.

The user equipment 440 also includes a processor 475 and a memory 480. The processor 475 may be used to execute instructions stored in the memory 480 and to store information in the memory 480 such as the results of the executed instructions. Some embodiments of the processor 475 and the memory 480 may be configured to perform portions of the method 300 shown in FIG. 3. For example, the processor 475 may implement a device connection manager (DCM) 485 to control the operation of the transceiver 445 and the radios 455, 460, 465. The DCM 485 may configure the user equipment 440 for uplink transmission on one or more channels of the unlicensed carrier 425 that were previously acquired by the base station 405 for an acquisition time interval. The DCM 485 may configure the user equipment 440 based on information provided by the base station 405, such as physical resource blocks allocated to the user equipment 440, a modulation and coding scheme used for the uplink transmissions, and the like.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc , magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   receiving, at a base station over a licensed frequency band, requests for resources in an unlicensed frequency band from user equipments;
   sensing that at least one channel is clear in response to a strength of a signal received on the at least one channel being below a first threshold value;
   acquiring, at the base station, at least one channel in an unlicensed frequency band for a predetermined time interval, wherein acquiring the at least one channel comprises acquiring the at least one channel in response to sensing that the at least one channel is clear, wherein acquiring the at least one channel comprises transmitting energy from the base station during a first portion of the predetermined time interval; and
   scheduling, at the base station, the user equipments for uplink transmission on the at least one channel during a second portion of the predetermined time interval, wherein scheduling the user equipments comprises scheduling the user equipments in response to receiving the requests, the scheduling being performed on a time division multiplexed basis so that the at least one channel is allocated to different user equipment during different portions of the second portion of the predetermined time interval, wherein the scheduling includes transmitting, by the base station toward the user equipments, respective scheduling information that includes information indicating the second portion of the predetermined time interval allocated to the user equipments for uplink transmission on the at least one channel in the unlicensed frequency band, indications that the user equipments are to wait for subsequent indications that the at least one channel is clear for uplink transmission before beginning the uplink transmissions, and information indicating resources in the second portion of the predetermined time interval that are allocated to the user equipments for uplink transmission.

2. The method of claim 1, wherein transmitting energy from the base station during the first portion of the predetermined time interval comprises transmitting a signal indicative of energy produced by a random signal or a preamble from the base station during the first portion of the predetermined time interval.

3. The method of claim 1, wherein the scheduling information is transmitted toward the user equipments in respective control messages sent from the base station toward the user equipments.

4. The method of claim 1, wherein the information indicating the second portion of the predetermined time interval allocated to the user equipments for uplink transmission on the at least one channel in the unlicensed frequency band and the indications that the user equipments are to wait for subsequent indications that the at least one channel is clear for uplink transmission before beginning the uplink transmissions are transmitted toward the user equipments in respective control messages sent from the base station toward the user equipments, wherein the information indicating resources in the second portion of the predetermined time interval that are allocated to the user equipments for uplink transmission are transmitted toward the user equipments in respective scheduling messages sent from the base station toward the user equipments subsequent to the respective control messages.

5. The method of claim 1, further comprising:
   receiving an uplink transmission from the at least one user equipment during the second portion of the predetermined time interval.

6. The method of claim 1, wherein the scheduling is performed using at least one of respective amounts of data available for transmission over the uplink by the user equipments, respective priorities associated with the user equipments, or respective channel quality information associated with the user equipments.

7. The method of claim 1, wherein the scheduling information is transmitted in a licensed frequency band.

8. The method of claim 1, wherein the indications that the user equipments are to wait for subsequent indications that the at least one channel is clear for uplink transmission before beginning the uplink transmissions include respective flags set to indicate that the user equipments are to wait for the subsequent indications that the at least one channel is clear for uplink transmission before beginning the uplink transmissions.

9. A method comprising:
  transmitting, by user equipments over a licensed frequency band, requests for resources in an unlicensed frequency band;
  receiving, at a base station over the licensed frequency band, the requests for resources in the unlicensed frequency band from the user equipments;
  sensing, at the base station, that at least one channel is clear in response to a strength of a signal received on the at least one channel being below a first threshold value;
  acquiring, at the base station, at least one channel in an unlicensed frequency band for a predetermined time interval, wherein acquiring the at least one channel comprises acquiring the at least one channel in response to sensing that the at least one channel is clear, wherein acquiring the at least one channel comprises transmitting energy from the base station during a first portion of the predetermined time interval;
  scheduling, at the base station, the user equipments for uplink transmission on the at least one channel during a second portion of the predetermined time interval, wherein scheduling the user equipments comprises scheduling the user equipments in response to receiving the requests, the scheduling being performed on a time division multiplexed basis so that the at least one channel is allocated to different user equipment during different portions of the second portion of the predetermined time interval, wherein the scheduling includes transmitting, by the base station toward the user equipments, respective scheduling information that includes information indicating the second portion of the predetermined time interval allocated to the user equipments for uplink transmission on the at least one channel in the unlicensed frequency band, indications that the user equipments are to wait for a subsequent indication that the at least one channel is clear for uplink transmission before beginning the uplink transmissions, and information indicating resources in the second portion of the predetermined time interval that are allocated to the user equipments for uplink transmission;
  performing uplink transmission by the user equipments in accordance with the scheduling.

10. The method of claim 9, wherein the scheduling is performed using at least one of respective amounts of data available for transmission over the uplink by the user equipments, respective priorities associated with the user equipments, or respective channel quality information associated with the user equipments.

11. The method of claim 9, wherein the scheduling information is transmitted in a licensed frequency band.

12. The method of claim 9, wherein the indications that the user equipments are to wait for subsequent indications that the at least one channel is clear for uplink transmission before beginning the uplink transmissions include respective flags set to indicate that the user equipments are to wait for the subsequent indications that the at least one channel is clear for uplink transmission before beginning the uplink transmissions.

13. A base station comprising:
  at least one processor; and
  at least one memory storing instructions which, when executed by at least one processor, cause the base station to perform:
    receiving, over a licensed frequency band, requests for resources in an unlicensed frequency band from user equipments;
    sensing that at least one channel is clear in response to a strength of a signal received on the at least one channel being below a first threshold value;
    acquiring at least one channel in an unlicensed frequency band for a predetermined time interval, wherein acquiring the at least one channel comprises acquiring the at least one channel in response to sensing that the at least one channel is clear, wherein acquiring the at least one channel comprises transmitting energy from the base station during a first portion of the predetermined time interval; and
    scheduling the user equipments for uplink transmission on the at least one channel during a second portion of the predetermined time interval, wherein the user equipments are scheduled in response to the requests, wherein the user equipments are scheduled on a time division multiplexed basis so that the at least one channel is allocated to different user equipment during different portions of the second portion of the predetermined time interval, wherein the scheduling includes transmitting, by the base station toward the user equipments, respective scheduling information that includes information indicating the second portion of the predetermined time interval allocated to the user equipments for uplink transmission on the at least one channel in the unlicensed frequency band, indications that the user equipments are to wait for subsequent indications that the at least one channel is clear for uplink transmission before beginning the uplink transmissions, and information indicating resources in the second portion of the predetermined time interval that are allocated to the user equipments for uplink transmission.

14. The base station of claim 13, wherein the scheduling is performed using at least one of respective amounts of data available for transmission over the uplink by the user equipments, respective priorities associated with the user equipments, or respective channel quality information associated with the user equipments.

15. The base station of claim 13, wherein the scheduling information is transmitted in a licensed frequency band.

16. The base station of claim 13, wherein the indications that the user equipments are to wait for subsequent indications that the at least one channel is clear for uplink transmission before beginning the uplink transmissions include respective flags set to indicate that the user equipments are to wait for the subsequent indications that the at least one channel is clear for uplink transmission before beginning the uplink transmissions.

17. User equipment comprising:
  at least one processor; and
  at least one memory storing instructions which, when executed by at least one processor, cause the user equipment to:
    transmit, over a licensed frequency band to a base station, a request for resources for uplink transmission in an unlicensed frequency band;
    receive, by the user equipment from the base station, scheduling information that includes information indicating a first portion of a predetermined time interval that is allocated to the user equipment for uplink transmission on at least one channel in the unlicensed frequency band, an indication that the user equipment is to wait for a subsequent indication that the at least one channel is clear for uplink transmission before beginning the uplink transmission, and information indicating resources in the first portion of the predetermined time interval that are allocated to the user equipment for uplink transmission; and configure, based on the scheduling information, the user equipment for uplink transmission on the at least one channel in the unlicensed frequency band using the resources in the first portion of the predetermined time interval that are allocated to the user equipment for uplink transmission.

18. The user equipment of claim 17, wherein the scheduling information is received in a single control message from the base station.

19. The user equipment of claim 17, wherein the information indicating the first portion of the predetermined time interval that is allocated to the user equipment for uplink transmission on the at least one channel in the unlicensed frequency band and the indication that the user equipment is to wait for the subsequent indication that the at least one channel is clear for uplink transmission before beginning the uplink transmission are received in a control message, wherein the information indicating resources in the first portion of the predetermined time interval that are allocated to the user equipment for uplink transmission is received in a scheduling message subsequent to receipt of the control message.

20. The user equipment of claim 17, wherein the request is indicative of at least one of an amount of data available for transmission by the user equipment, a priority associated with the user equipment or channel quality information associated with the user equipment.

21. The user equipment of claim 17, wherein the first portion of the predetermined time interval that is allocated to the user equipment for uplink transmission on the at least one channel in the unlicensed frequency band is time-division-multiplexed with at least one second portion of the predetermined time interval that is allocated to at least one other user equipment for uplink transmission on the at least one channel in the unlicensed frequency band.

* * * * *